United States Patent
Lin et al.

(10) Patent No.: US 6,870,731 B2
(45) Date of Patent: Mar. 22, 2005

(54) MOUNTING APPARATUS FOR A SECURING PANEL

(75) Inventors: Kuo-Chih Lin, Tu-chen (TW); Da-Long Sun, Shenzhen (CN); Li Tong, Shenzhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 144 days.

(21) Appl. No.: 10/407,282

(22) Filed: Apr. 3, 2003

(65) Prior Publication Data
US 2004/0136151 A1 Jul. 15, 2004

(30) Foreign Application Priority Data
Jan. 15, 2003 (TW) .......................... 92200666 A

(51) Int. Cl.$^7$ ................................. H02H 3/00
(52) U.S. Cl. ............... 361/683; 361/725; 361/755; 361/757; 312/223.2; 174/35 R
(58) Field of Search ................................. 361/683, 684, 361/725–727, 755–759, 788, 797; 312/223.1, 223.2, 223.3, 263, 257.1, 265.5, 265.6, 293.3; 174/138 G, 138 D, 34 R, 35 R, 35 GC, 138 R; 248/65, 71, 73, 75; 211/41.17; 403/408.1, 168, 258, 21; 24/297, 458, 453, 563, 573.2

(56) References Cited

U.S. PATENT DOCUMENTS

| | | | | |
|---|---|---|---|---|
| 5,145,243 A | | 9/1992 | Liu | |
| 5,490,038 A | * | 2/1996 | Scholder et al. | 361/759 |
| 5,691,504 A | * | 11/1997 | Sands et al. | 174/35 R |
| 6,097,591 A | * | 8/2000 | Ircha | 361/683 |
| 6,114,626 A | * | 9/2000 | Barnes et al. | 174/52.1 |
| 6,234,592 B1 | * | 5/2001 | Liu et al. | 312/223.2 |
| 6,362,968 B1 | * | 3/2002 | Lajara et al. | 361/752 |
| 6,362,978 B1 | * | 3/2002 | Boe | 361/825 |
| 6,377,445 B1 | * | 4/2002 | Davis et al. | 361/683 |
| 6,385,051 B1 | * | 5/2002 | Perez et al. | 361/759 |
| 2004/0075974 A1 | * | 4/2004 | Chen | 361/683 |
| 2004/0125576 A1 | * | 7/2004 | Lin et al. | 361/759 |

* cited by examiner

Primary Examiner—Michael Datskocsky
(74) Attorney, Agent, or Firm—Wei Te Chung

(57) ABSTRACT

A mounting apparatus includes a lock member (20), a support panel (30), and a securing panel (40). The support panel includes a main wall (32). First and second lock plates (33, 34) and catches (35) are arranged on the main wall. The securing panel includes a base board (41) and a flange (42). Catch holes (49) are defined in the base board, the catch holes engagingly receiving the catches. Two openings (45) are defined between the base board and the flange. The lock member includes two latches (22) engaging in the openings. First and second cutouts (23, 24) are defined respectively in opposite sides of the lock member. The first and second lock plates of the support panel are passed through the first and second cutouts of the lock member, thereby enabling the lock member to be slidably retained on the main wall by the first and second lock plates.

14 Claims, 6 Drawing Sheets

MOUNTING APPARATUS FOR A SECURING PANEL

BACKGROUND OF THE INVENTION

1. Field of the Invention

The present invention relates generally to apparatuses for mounting computer components within a computer chassis, and more particularly to a mounting apparatus for easily installing and removing a securing panel in and from computer chassis.

2. Related Art

A number of different means and devices are used to mount motherboard panels to computer chassis. One widely used conventional means is to simply form the motherboard panel and the chassis integrally from a sheet of metal. A motherboard is then screwed to the motherboard panel by a plurality of screws. A significant drawback of this means is that the insertion and removal of screws is time consuming and cumbersome, particularly due to workspace restrictions and accessibility limitations existing within a typical computer chassis. More recent developments in the art facilitate installation and removal of motherboards by other means. These include the use of removable motherboard panels, such as those described below.

U.S. Pat. No. 5,145,243 discloses a motherboard panel assembly structure that does not require the use of screws to secure the motherboard panel to the chassis frame. A motherboard is secured to the securing panel. A system incorporating a spring loaded latch is used for securing the combined motherboard and motherboard panel to the chassis frame. This arrangement makes the assembly of the motherboard panel into the chassis structure simple, but at the expense of substantial additional components and complexity in the fastening structure itself.

For the above reasons, an improved mounting apparatus for a motherboard panel is desired.

SUMMARY OF THE INVENTION

Accordingly, an object of the present invention is to provide a mounting apparatus with a simple structure which readily allows attachment and removal of a motherboard panel to and from a computer chassis.

To achieve the above-mentioned object, a mounting apparatus in accordance with a preferred embodiment of the present invention is adapted to mount a securing panel in a computer chassis. The mounting apparatus includes a lock member, a support panel and a securing panel. A motherboard is screwed to the securing panel. The lock member secures the securing panel to the support panel. The support panel includes a main wall. A pair of first and second lock plates and a plurality of catches is arranged on the main wall. The securing panel includes a base board and a first flange. A plurality of catch holes is defined in the base board, the catch holes engagingly receiving the catches of the support panel. A pair of openings is defined between the base board and the first flange. The lock member includes a pair of latches engaging in the openings of the securing panel. A pair of first and second cutouts are defined respectively in lateral sides of the lock member. When the lock member is attached to the main wall of the support panel, the first and second lock plates of the support panel pass through the first and second cutouts of the lock member, thereby enabling the lock member to be slidably retained on the main wall by the first and second lock plates.

Other objects, advantages and novel features of the present invention will be drawn from the following detailed description of the preferred embodiment of the present invention with the attached drawings, in which:

DESCRIPTION OF THE PREFERRED EMBODIMENT

Figure 1:
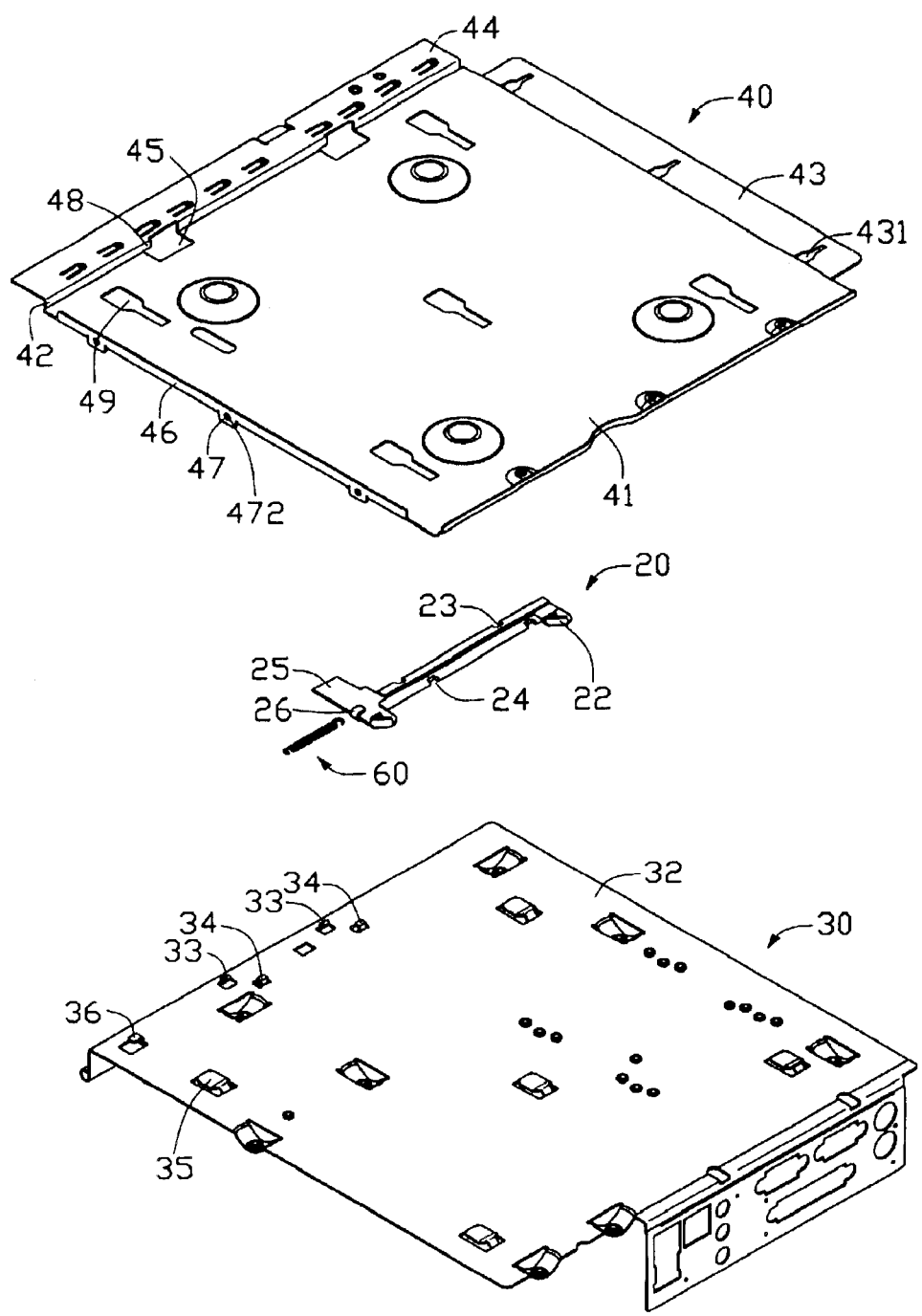
FIG. 1 is an exploded, isometric view of a mounting apparatus for a securing panel in accordance with the preferred embodiment of the present invention.

Referring to FIG. 1, a mounting apparatus for a computer chassis 50 in accordance with the preferred embodiment of the present invention comprises a lock member 20, a support panel 30, a securing panel 40 and a spring 60.

Figure 6:
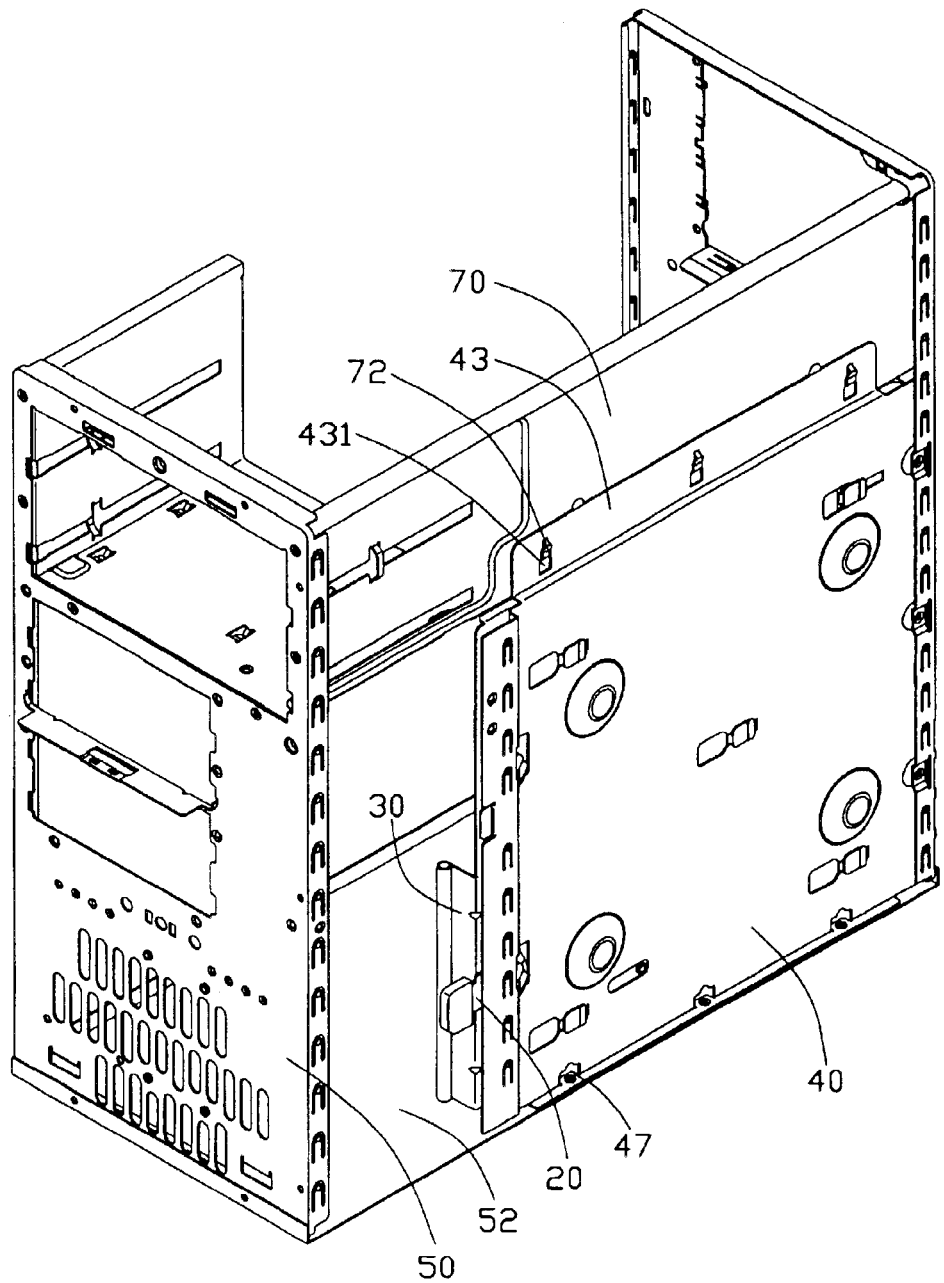
FIG. 6 is an isometric view of the assembled mounting apparatus of FIG. 4 attached to a computer chassis.
Figure 7:
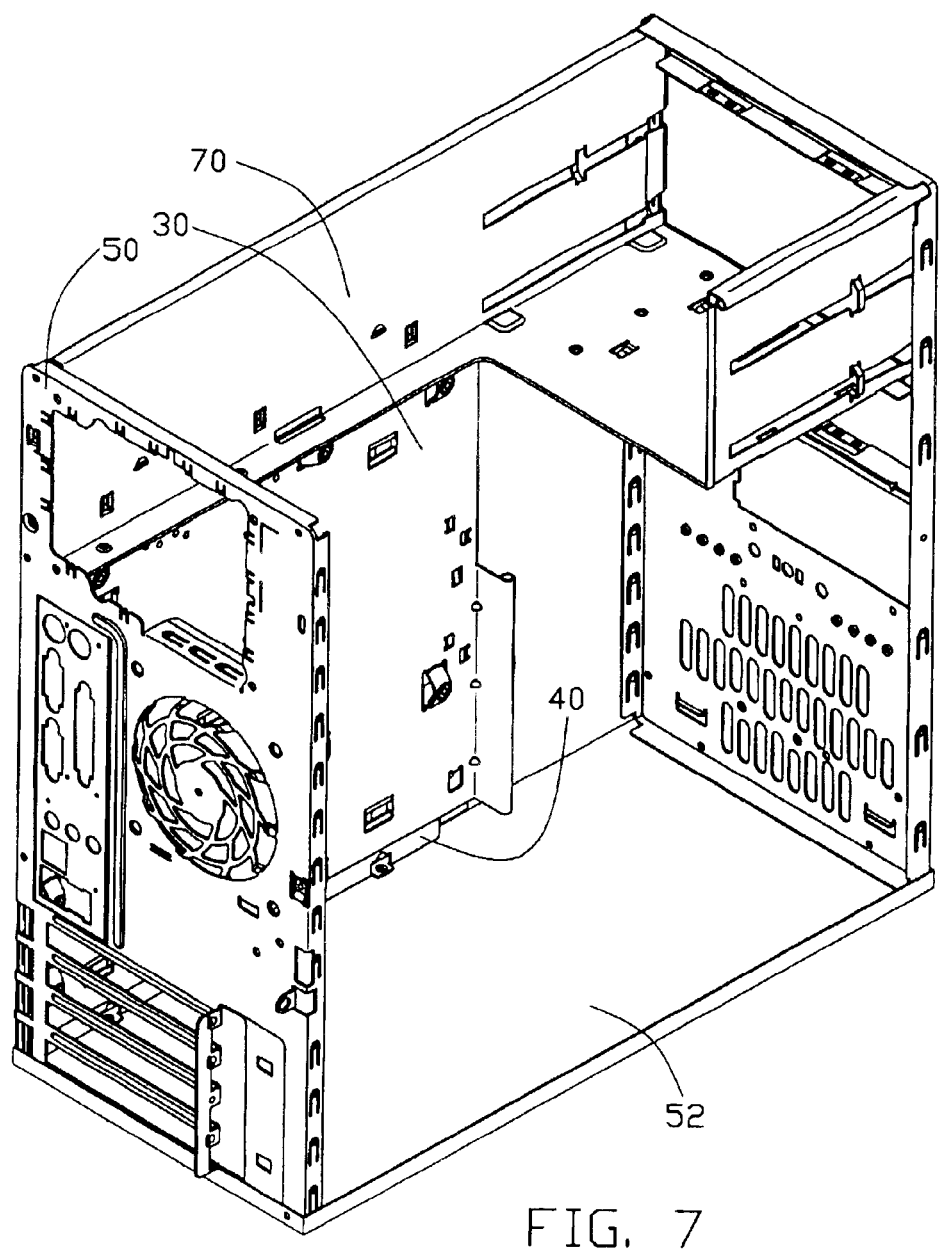
FIG. 7 is similar to FIG. 6, but viewed from another aspect.

Referring to FIGS. 6–7, the chassis 50 comprises a bottom plate 52. A plurality of lock holes (not shown) is defined in the bottom plate 52. A disk drive bracket 70 is secured to the chassis 50. A plurality of hooks 72 is formed on the drive bracket 70.

Figure 2:
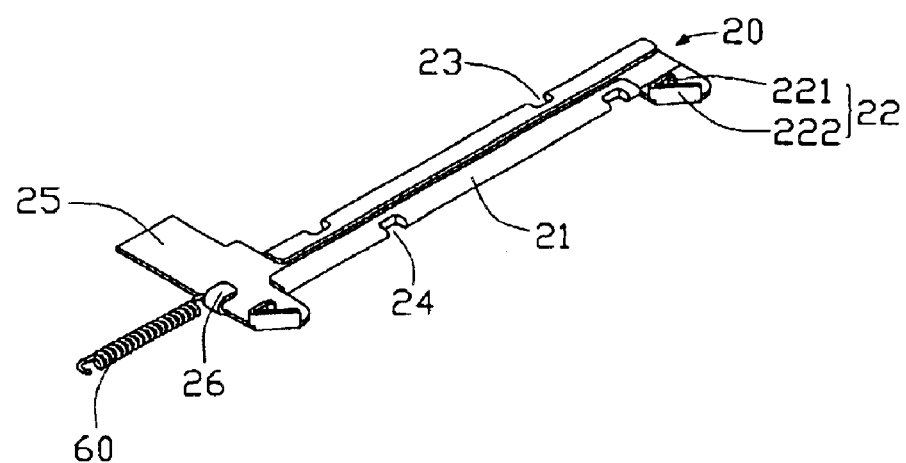
FIG. 2 is an enlarged view of a lock member of the mounting apparatus of FIG. 1.

Referring particularly to FIG. 2, the lock member 20 is generally elongate, and comprises a main body 21. A pair of latches 22 is provided at opposite ends of the main body 21 respectively, at a same side of the main body 21. Each latch 22 comprises a first contact portion 221, and a slanted guide portion 222. An operation body 25 is formed at an opposite side of the main body 21, integral with and opposite from one of the latches 22. A first clasp 26 is formed at an end of the main body 21 that corresponds to the operation body 25. A pair of spaced, rectangular first cutouts 23 is defined in said opposite side of the main body 21. A pair of spaced, rectangular second cutouts 24 is defined in said same side of the main body 21.

Referring to FIG. 1, the support panel 30 comprises a main wall 32. A pair of generally L-shaped first lock plates 33 and a pair of generally L-shaped second lock plates 34 project outwardly from a rear portion of the main wall 32. The second lock plates 34 are aligned parallel to an alignment of the first lock plates 33. The first and second lock plates 33, 34 are dimensioned so that they can pass through the first and second cutouts 23, 24 of the lock member 20 respectively. A second clasp 36 projects outwardly from a rear corner of the main wall 32, in general alignment with the alignments of the first and second lock plates 33, 34. The second clasp 36 is complementary to the first clasp 26 of the lock member 20. The spring 60 is attachable between the first and second clasps 26, 36. A plurality of generally evenly spaced catches 35 protrudes outwardly from the main wall 32.

The securing panel 40 comprises a base board 41. A plurality of catch holes 49 is defined in the base board 41, for engagingly receiving the catches 35 of the support panel 30. A first flange 42 and a second flange 46 extend perpendicularly outwardly from a pair of neighboring edges of the base board 41. A first peripheral board 44 extends perpendicularly from a distal edge of the first flange 42, such that the first peripheral board 44 extends away from but is generally parallel to the base board 41. A second peripheral board 43 extends from an edge of the base board 41 that is opposite from the second flange 46. The second peripheral board 43 is generally parallel to the base board 41, but offset inwardly from the base board 41. A pair of openings 45 is defined in a junction of a portion of the base board 41 and the first flange 42, for engagingly receiving the latches 22 of the lock member 20. The first flange 42 at each opening 45 defines a second contact portion 48, corresponding to the first contact portion 221 of a respective latch 22. A plurality of tabs 47 depends from the second flange 46, each tab 47 defining a lock hole 472 therein. The lock holes 472 correspond to the lock holes (not shown) of the bottom plate 52 of the chassis 50, for securing the securing panel 40 to the chassis 50. The second peripheral board 43 defines a plurality of spaced latch holes 431 therein. The latch holes 431 are for engagingly receiving the hooks 72 of the drive bracket 70, and thereby attaching the securing panel 40 to the chassis 50.

Figure 3:
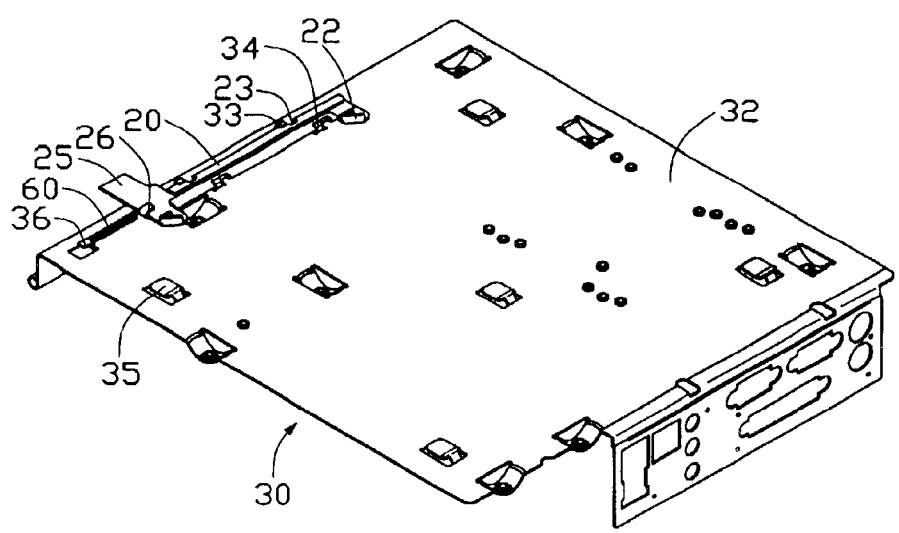
FIG. 3 is an isometric view of the lock member and a support panel of the mounting apparatus of FIG. 1 assembled together.

Referring to FIGS. 3–7, in assembly, the lock member 20 is attached to the support panel 30. The first and second lock plates 33, 34 of the support panel 30 are passed through the first and second cutouts 23, 24 of the main wall 32 of the support panel 30. The lock member 20 is then slidably retained on the main wall 32 between the first and second lock plates 33, 34. The spring 60 is attached between the first clasp 26 of the lock member 20 and the second clasp 36 of the support panel 30, thereby limiting movement of the lock member 20. The assembled lock member 20 and support panel 30 is shown in FIG. 3.

Figure 4:
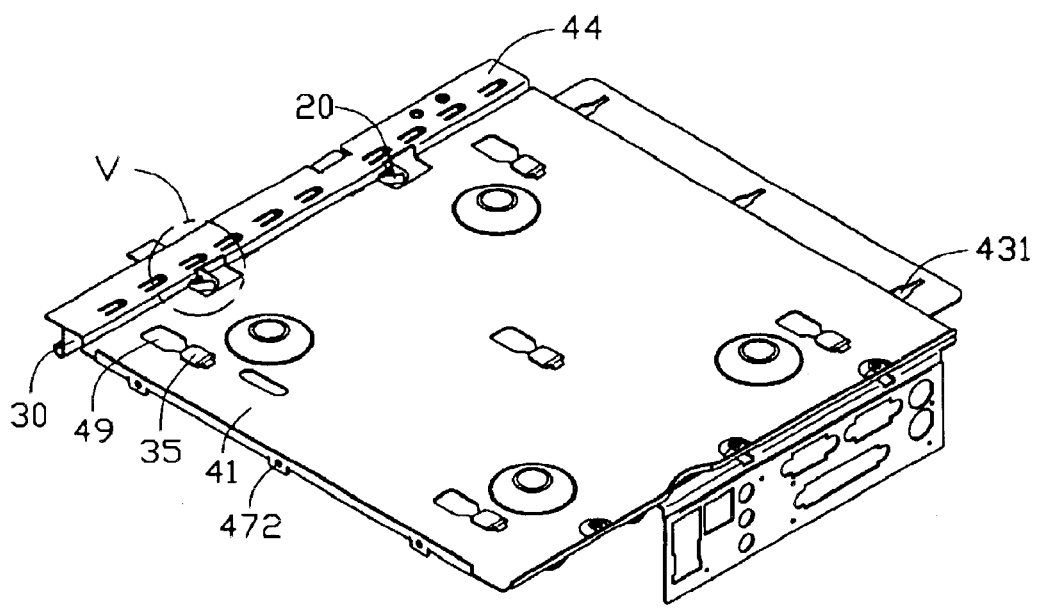
FIG. 4 is an assembled view of FIG. 1.
Figure 5:
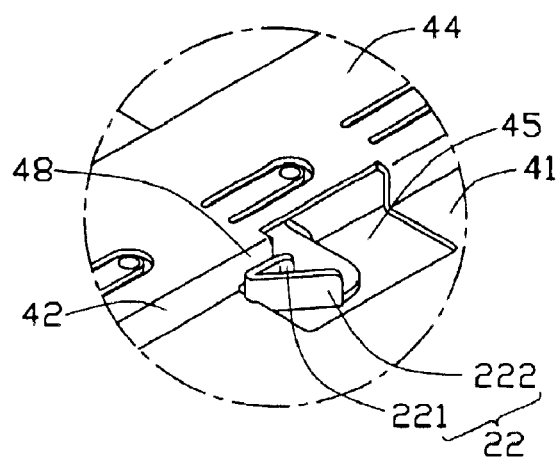
FIG. 5 is an enlarged view of a circled portion V of FIG. 4.

The securing panel 40 is then secured to the support panel 30 by the lock member 20. The catches 35 of the support panel 30 are loosely received in the catch holes 49 of the securing panel 40. Simultaneously, the guide portions 222 of the latches 22 of the lock member 20 oppose respective edges of the second contact portions 48 at the openings 45 of the securing panel 40. The securing panel 40 is pushed forwardly so that the catches 35 of the support panel 30 fully engage in the catch holes 49 of the securing panel 40. Simultaneously, the guide portions 222 of the latches 22 ride over said edges of the second contact portions 48, and the spring 60 is stretched. When the latches 22 have fully entered the openings 45 of the securing panel 40, the spring 60 rebounds back toward its original state. The spring 60 thus pulls the latches 22 further into the openings 45 such that the first contact portions 221 of the latches 22 oppose the respective second contact portions 48 at the openings 45 (see FIG. 5). Thus the securing panel 40 is firmly secured to the support panel 30, as shown in FIG. 4.

The combined support panel 30 and securing panel 40 is then attached to the chassis 50. The latch holes 431 of the second peripheral board 43 of the securing panel 40 engagingly receive the hooks 72 of the drive bracket 70, such that the securing panel 40 is vertically suspended from the drive bracket 70. Fasteners such as screws are extended throught the lock holes 472 of the tabs 47 of the securing panel 40 and the lock holes (not shown) of the bottom plate 52 of the chassis 50, so that the combined support panel 30 and securing panel 40 is securely attached to the chassis 50 (see FIGS. 6–7).

In disassembly, the screws are removed, and the combined support panel 30 and securing panel 40 is lifted off of the hooks 72. The operation body 25 of the lock member 20 is pulled so that the spring 60 is stretched and the latches 22 are disengaged from the first flange 42. The securing panel 40 is slid rearwardly. The latches 22 exit the openings 45, and the catches 35 of the support panel 30 slide so that they are loosely disposed in the catch holes 49 of the securing panel 40. The securing panel 40 is then lifted off of the support panel 30.

It is understood that the invention may be embodied in other forms without departing from the spirit thereof. Thus, the present example and embodiment is to be considered in all respects as illustrative and not restrictive, and the invention is not to be limited to the details given herein.

What is claimed is:

1. A mounting apparatus for a computer chassis comprising:

a securing panel adapted to be secured to the computer chassis, the securing panel comprising a base board and a first flange, the base board defining a plurality of catch holes, the securing panel defining at least one opening between the base board and the first flange;

a support panel for mounting the securing panel thereon, the support panel comprising a main wall, at least one first lock plate, at least one second lock plate and a plurality of catches being arranged at the main wall, the catches engaging in the catch holes of the base board of the securing panel; and a lock member securing the securing panel on the support panel, the lock member comprising at least one latch engaging in the at least one opening of the securing panel, the lock member slidably engaging between the first and second lock plates of the support panel.

2. The mounting apparatus as claimed in claim 1, wherein when the at least one latch of the lock member is released from the at least one opening of the securing panel, the catches of the support panel is releasable from the catch holes of the securing panel.

3. The mounting apparatus as claimed in claim 1, wherein the lateral sides of the lock member respectively defines a pair of first cutouts and a pair of second cutouts, for the first and second lock plates of the support panel passing through to allow the lock member to slide between the first and second lock plates.

4. The mounting apparatus as claimed in claim 1, wherein the lock member comprises a first clasp, the support panel comprises a second clasp, and a spring is attachable between the first and second clasps.

5. The mounting apparatus as claimed in claim 1, wherein the at least one latch of the lock member comprises a first contact portion and a slanted guide portion.

6. The mounting apparatus as claimed in claim 5, wherein the at least one opening of the securing panel is bounded by a second contact portion corresponding to the first contact portion of the at least one latch of the lock member.

7. The mounting apparatus as claimed in claim 1, wherein the lock member comprises two latches, and one of the latches extends to form an operation body.

8. The mounting apparatus as claimed in claim 1, wherein the first and second lock plates of the support panel are generally L-shaped, and are formed at a rear portion of the main wall.

9. The mounting apparatus as claimed in claim 1, wherein the securing panel further comprises a second flange perpendicular to the first flange, a plurality of tabs depends from the second flange, and each of the tabs defines a lock hole.

10. The mounting apparatus as claimed in claim 9, wherein the securing panel further comprises a peripheral board opposite from the second flange, and the peripheral board defines a plurality of latch holes.

11. A computer enclosure comprising:
   a chassis comprising a bottom plate, the bottom plate defining a plurality of lock holes;
   a drive bracket attached to the chassis, a plurality of hooks being formed on the drive bracket;
   a securing panel secured to the chassis between the bottom plate and the drive bracket, the securing panel comprising a base board, a peripheral board and a flange, the securing panel defining at least one opening, the peripheral board defining a plurality of latch holes engagingly receiving the hooks of the drive bracket, the flange defining a plurality of lock holes for extension of fasteners to engage in corresponding lock holes of the chassis;
   a support panel mounting the securing panel thereon, the support panel comprising a main wall, a pair of first lock plates and a pair of second lock plates being arranged on the main wall; and
   a lock member securing the securing panel to the support panel, the lock member comprising at least one latch engaging in the at least one opening of the securing panel, the lock member slidably engaging between the first and second lock plates of the support panel;
   wherein when the at least one latch is released from the at least one opening by operation in the lock member the support panel is releasable from the securing panel.

12. The computer enclosure as claimed in claim 11, wherein the lateral sides of the lock member respectively defines a pair of first cutouts and a pair of second cutouts, for the first and second lock plates of the support panel passing through to allow the lock member to slide between the first and second lock plates.

13. The computer enclosure as claimed in claim 12, wherein the base board of the securing panel defines a plurality of catch holes, a plurality of catches is arranged on the main wall of the support panel, the plurality of catches engage in the plurality of catches correspondingly.

14. A computer enclosure comprising:
   a chassis defining a main structure of the enclosure;
   a securing panel having means for attachment to the chassis;
   a support panel located under the securing panel;
   a plurality of catch holes definnig in one of said securing panel and said support panel, each of said catch holes including threof a large section and a small section both extending in a first direction;
   a plurality of catches defining on the other of said securing panel and said support panel, each of said catches incluidng a large portion and a small portion extending in said first direction in compliance with said large section and said small section of the correspnding catch hole;
   a locking member assembled to one of said securing panel and said support panel and retractably moveable along a second direction perpendicular to said first direction, a latch formed on one of the other of said securing panel and said support panel without said locking member assembled thereon and said locking member, and an locking opening, corresponding to said latch, formed in the other of said other of said securing panel and said support panel without said locking member assembled theron and said locking member; wherein
   said securing panel and said support panel is assembled to each other under following procedures:
   the large section and the large portion being aligned with each other in a third direction perpendicular to both said first and second directions,
   the large portion extending through said large section in said third direction,
   the securing panel and said support panel moved relative to each other along said first direction to have the large portion confront the small section when said securing panel and said support panel reach final relative positions with each other so as to prevent relative movement between the securing panel and said support panel in said third direction, wherein at the same time, the locking member is retractably moved along said second direction to allow said relative movement along said first direction and finally the latch is locked in said locking opening once both of said securng panel and said support panel reach the final relative positions.

* * * * *